US 6,543,916 B2

(12) United States Patent
Shirai (10) Patent No.: US 6,543,916 B2
(45) Date of Patent: Apr. 8, 2003

(54) VEHICULAR HEADLAMP WITH MOVABLE REFLECTOR

(75) Inventor: Katsutada Shirai, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 216 days.

(21) Appl. No.: 09/805,584

(22) Filed: Mar. 14, 2001

(65) Prior Publication Data

US 2001/0036080 A1 Nov. 1, 2001

(30) Foreign Application Priority Data

Mar. 14, 2000 (JP) ........................................ 2000-070578

(51) Int. Cl.[7] .............................................. F21V 17/02
(52) U.S. Cl. ........................ 362/460; 362/530; 362/523; 362/531; 362/532
(58) Field of Search ................................ 362/523, 530, 362/531, 532, 460

(56) References Cited

U.S. PATENT DOCUMENTS

| | | | |
|---|---|---|---|
| 5,546,283 A | | 8/1996 | Ohtsuka et al. ................ 362/61 |
| 5,647,659 A | | 7/1997 | Mori ............................ 362/66 |
| 5,660,455 A | * | 8/1997 | Tsukamoto et al. ............ 362/66 |
| 5,673,915 A | * | 10/1997 | Shirai et al. ................... 362/61 |
| 5,707,134 A | * | 1/1998 | Nishizawa ..................... 362/66 |
| 6,220,735 B1 | * | 4/2001 | Matubara ...................... 362/523 |
| 6,247,834 B1 | * | 6/2001 | Suehiro ........................ 362/463 |
| 6,290,379 B1 | * | 9/2001 | Iwasaki et al. ............... 362/512 |
| 6,315,438 B1 | * | 11/2001 | Shirai et al. ................. 362/507 |
| 6,299,335 B1 | * | 10/2002 | Shirai et al. ................. 362/514 |

* cited by examiner

Primary Examiner—Sandra O'Shea
Assistant Examiner—Anabel Ton
(74) Attorney, Agent, or Firm—Sughrue Mion, PLLC (57) ABSTRACT

A vehicular headlamp with a movable reflector in which suitable aiming is possible using an aiming screw made from synthetic resin. The headlamp includes a synthetic resin lamp body and synthetic resin front lens that define a lamp compartment is which a reflector carrying a light source is housed. An aiming mechanism is disposed between the lamp body and the reflector and that supports the reflector such that it may be tilted relative to the lamp body. The aiming mechanism includes an aiming fulcrum that forms a tilt fulcrum for the reflector, a synthetic resin screw that extends forward and is rotatably supported in the screw insertion hole of the lamp body, and a synthetic resin nut member attached to a bracket formed on the reflector that meshes with the screw and is moved forward or backward in connection with the rotation of the screw. A nut slide guide carrying the nut member and supporting it so that it can slide forward and backward is integrally formed with the lamp body.

11 Claims, 11 Drawing Sheets

VEHICULAR HEADLAMP WITH MOVABLE REFLECTOR

BACKGROUND OF THE INVENTION

The present invention relates to a vehicular headlamp of a type having a moveable reflector in which the reflector with an attached light source is supported by an aiming mechanism so as to be tiltable relative to a lamp body. More particularly, the invention relates to a vehicular headlamp with a movable reflector in which the aiming screw, which is a structural member of the aiming mechanism, is formed from synthetic resin.

Figure 15:
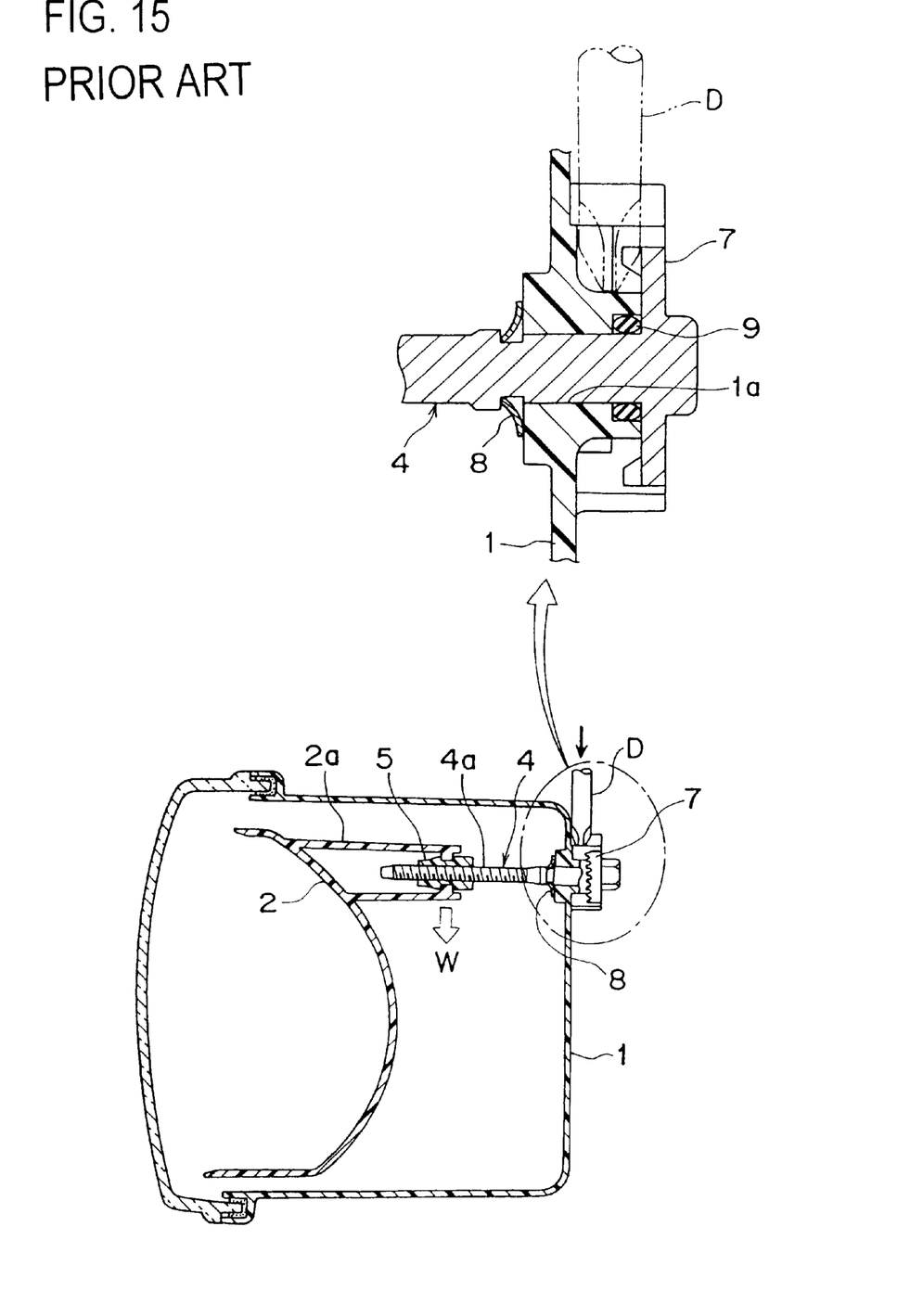
FIG. 15 is a cross-sectional view of the periphery of the rotation support portion of a conventional aiming screw.

As is shown in FIG. 15, in a conventional vehicular headlamp of this type, a synthetic resin reflector 2 on which is mounted a light source is supported near the front surface of a synthetic resin lamp body 1 by an aiming mechanism formed from one ball joint, which is a tilting fulcrum, and two nut members. The nut members, which constitute moving support points capable of moving forward and backward in the axial direction, mesh with respective ones of the aiming screws.

More specifically, an aiming screw 4 is rotatably supported in a screw insertion hole 1a provided in the lamp body 1, and a synthetic resin nut member 5, attached to a bracket 2a that extends out from the reflector 2, meshes with a threaded portion 4a of the aiming screw 4, which protrudes toward the front of the lamp body 1. By rotating the aiming screw 4, the nut member 5 is made to advance or retreat along the aiming screw 4, whereupon the reflector 2 tilts about a tilt axis that connects the ball joint and the nut member that meshes with another aiming screw. As a result, the optical axis of the lamp can be adjusted.

The aiming screw 4 is made from metal and has a crown-shaped gear 7 formed integrally at the rear end portion thereof. The aiming screw 4 can be rotated using a screwdriver D. The aiming screw 4, which is inserted through the screw insertion hole 1a from the rear of the lamp body 1, is elastically supported in the longitudinal direction by a push-on fixing element 8 and is thereby held in position.

In addition, an O ring 9, which serves as a sealing member, is inserted in the screw insertion hole 1a that rotatably supports the aiming screw 4, thereby waterproofing the rotation support portion of the aiming screw 4.

However, in the above described lamp, because the aiming screw 4 is made of metal, there has been a limit as to how much the weight of the aiming mechanism and the headlamp could be reduced. Therefore, in recent years, proposals have been made to form the aiming screw out of synthetic resin in order to reduce the weight of the headlamp.

However, when the aiming screw is made of synthetic resin, a problem as described below has occurred, and thus an aiming screw made of synthetic resin has not been put to actual use prior to the invention.

Namely, as is indicated by the symbol W in FIG. 15, the weight of the reflector acts on the distal end of the aiming screw 4, which is supported in a cantilever fashion, resulting in the proximal end portion of the aiming screw 4 being easily deformed by bending and creating durability problems.

The nut member 5 attached to the reflector bracket 2a is formed so as to be able to rock slightly relative to the bracket 2a; however, it is not possible to reliably remove the stress generated in the attachment portion between the bracket 2a and the nut member 5. Therefore, problems arise such as the reflector 2 and the aiming screw 4 being deformed due to the stress generated in the attachment portion between the nut member 5 and the bracket 2a when the nut member 5 is made to advance or retreat along the screw upon rotation of the aiming screw 4, and therefore appropriate aiming is not always possible.

SUMMARY OF THE INVENTION

The present invention was conceived in view of the above situation, and it is an object thereof to provide a vehicular headlamp with a movable reflector in which appropriate aiming is ensured by the use of an aiming screw made from synthetic resin.

In order to achieve the above and other objects, a first embodiment of the present invention is provided in the form of a vehicular headlamp with a movable reflector, and which comprises a container-shaped lamp body made from synthetic resin, a front lens made from synthetic resin attached to a front surface aperture portion of the lamp body so as to define together with the lamp body a lamp compartment, a reflector with an attached light source and housed in the lamp compartment, and an aiming mechanism that is provided between the lamp body and the reflector and that supports the reflector tiltably relative to the lamp body, wherein the aiming mechanism includes an aiming fulcrum that forms a tilt fulcrum of the reflector, a synthetic resin aiming screw that is rotatably supported in a screw insertion hole provided in the lamp body and extends in a forward direction, and a synthetic resin nut member that is attached to a bracket formed extending from the reflector, that meshes with the aiming screw, and that is made to advance or retreat by a rotation of the aiming screw, and wherein a nut slide guide is formed integrally with the lamp body and extending outward so as to carry and support the nut member in a manner whereby it can slide in a longitudinal direction, and stress relieving means having a ball joint structure is provided at an attachment portion where the nut member is attached to the bracket for relieving stress that is generated in the attachment portion as the nut member is made to advance or retreat.

Because the nut slide guide that is formed integrally with the lamp body carries the weight of the reflector that is borne by a nut member that meshes with the aiming screw, the bending moment created by the weight of the reflector does not act on the synthetic resin aiming screw.

Moreover, the stress that is generated between the aiming screw and the reflector in the portion where the nut member is attached to the bracket when the reflector is tilted relative to the lamp body due to the forward or backward movement of the nut member or when the reflector undergoes thermal expansion due to heat emitted from the light source is relieved by the stress relieving means having a ball joint structure that is provided at the attachment portion of the nut member and the bracket.

Further, because the nut member that is made to advance or retreat longitudinally by the rotation of the aiming screw is guided in a direction along the aiming screw by the nut slide guide, it is possible to keep the frictional torque in the portion where the nut member meshes with the aiming screw constant.

The aiming mechanism may include a vertical aiming screw provided at a position where it can move vertically toward or away from the aiming fulcrum, and a horizontal aiming screw provided at a position where it can move horizontally toward or away from the aiming fulcrum.

The nut member that meshes with the vertical aiming screw is made to advance or retreat along the vertical aiming screw by the rotation of the vertical aiming screw and the reflector is tilted about a horizontal tilt axis that passes through the aiming fulcrum and the attachment portion of the bracket and the nut member that meshes with the horizontal aiming screw.

The nut member that meshes with the horizontal aiming screw is made to advance or retreat along the horizontal aiming screw by the rotation of the horizontal aiming screw and the reflector is tilted about a vertical tilt axis that passes through the aiming fulcrum and the attachment portion of the bracket and the nut member that meshes with the vertical aiming screw.

The attachment portion of the bracket and the nut member may be formed from a ball engaging projection that protrudes from a side surface of the nut member that faces the aiming fulcrum and a ball receiving engaging hole that is provided in the bracket and that is engaged by the engaging projection. Further, the stress relieving means with a ball joint structure is constructed with the engaging protrusion and the engaging hole formed so as to be slidable relatively in the engaging direction, so as to be swingable relatively on a plane that contains the aiming screw, and so as to be rotatable relatively in the engaging hole peripheral direction.

The engaging hole may be partitioned into two holes by a partition wall that is parallel with the aiming screw, in which case the engaging projection is divided into two pieces and the bifurcated engaging projections so formed are each inserted into the respective holes so that the bifurcated portion is engaged with the partition wall, and the engaging projections are held in a state of pressure contact with inner peripheral surfaces of the engaging hole.

The partition wall of the engaging holes and the bifurcated engaging projections act as a guide when the engaging projection is inserted into the engaging hole. Moreover, the engaging projection that has been inserted into the engaging hole is held in a state of pressure contact by the inner peripheral walls of the engaging hole so that it does not come out and also acts to prevent vibration in the attachment portion of the nut member and the bracket.

It is also possible to provide convex portions at the opposing outer peripheral surfaces of the bifurcated engaging projections that are both placed in pressure contact with the inner peripheral surface of the engaging hole and that form a relative swinging axis of the engaging protrusion and the engaging hole.

With this structure, the axis passing through the pair of convex portions that are in pressure contact with the inner peripheral surface of the engaging hole becomes the relative swing axis of the engaging protrusion and the engaging hole, and accordingly smooth swinging of the engaging projection and the engaging hole is ensured. As a result, the reflector tilts smoothly and smooth aiming is made possible.

The nut member may be accommodated in a cylindrical slide guide whose side surface on the aiming fulcrum side is open and which extends longitudinally so as to cover the aiming screw, while the engaging projection protrudes from the side surface aperture portion of the slide guide, and an elastic protruding portion shaped like a plate spring that slides in a state of pressure contact along the nut slide guide is formed on a side surface of the nut member.

The elastic protruding portion shaped like a plate spring is in pressure contact with the nut slide guide and the nut member is elastically supported inside the nut slide guide without looseness so that smooth sliding of the nut member along the nut slide guide (the aiming screw) is ensured.

Furthermore, it is also possible to form the screw insertion holes using a cylindrically shaped portion that is formed integrally with the lamp body and extends forward while penetrating the lamp body. Also, it is possible to form the forward extending portion of the cylindrically shaped portion from a plurality of divided swinging pieces that are divided in the peripheral direction and elastically deformable in the radial direction and which have anchoring portions formed in the distal ends thereof that engage with concave-shaped engaging portions in the aiming screw so as to stop the aiming screw that is inserted from the rear of the lamp body from falling out from the rear. Moreover, it is possible to provide the aiming screw with a supported section that is supported by the screw insertion hole, a male threaded portion in front of the supported portion, and a rotation operation portion behind the supported portion, and to integrally form the aiming screw with a skirt-shaped elastic waterproofing rib that is in pressure contact with and also slides over the peripheral edge portions of the screw insertion hole.

By using this type of structure, when the aiming screw is inserted into the screw insertion hole from the outer side of the lamp body, the divided swinging pieces that form the forward extending end portion of the cylindrically shaped portion are pushed by the supported portion and are elastically deformed. Accordingly, the diameter thereof is enlarged in the radial direction, the supported portions penetrate the cylindrically shaped portion and the anchoring portions of the divided swinging pieces engage with the concave-shaped engaging portions of the aiming screw, while the skirt-shaped elastic ribs abut against the peripheral edge portion of the screw insertion hole. Consequently, the aiming screw is fixed in position in the axial direction relative to the screw insertion hole.

The skirt-shaped elastic waterproofing ribs formed at the rear end of the supported portion of the aiming screw are in pressure contact with and slide against the outer peripheral edge of the screw insertion hole, thereby preventing the intrusion of water into the portion between the aiming screw supported portion and the peripheral edge portion of the screw insertion hole at the rear of the lamp body and also elastically supporting the aiming screw in the longitudinal direction.

Both the waterproofing ribs and the lamp body are made from synthetic resin, and the slidability between the two is ensured in the sliding contact portion between the water proofing ribs and the screw insertion hole peripheral edge portion. The rotation of the aiming screw is not in any way hindered. Moreover, the synthetic resin waterproofing ribs are not deteriorated by water as much as are rubber O rings.

As a result, the aiming screw is elastically supported with no looseness in the longitudinal direction in the rotation support portion by the skirt-shaped elastic waterproofing ribs that are formed integrally with the aiming screw and are in sliding contact and pressure contact with the peripheral edge portions of the screw insertion holes. Also, the waterproofing of the rotation support portion of the aiming screw is ensured. Accordingly, there is no need to insert sealing members such as O rings or elastic members such as push-on fixing members in the rotation support portion of the aiming screw. Moreover, the number of parts used to form the aiming mechanism is reduced, thereby compacting the structure of the aiming mechanism and simplifying the task of assembling the aiming mechanism.

The synthetic resin waterproofing ribs will not deteriorated by water, even after lengthy use, and the elastic support and waterproofing of the rotation support section of the aiming screw is guaranteed over a long period of time.

It is also possible to use a structure in which second annular elastic waterproofing ribs that are in sliding contact with the inner peripheral surface of the screw insertion hole are formed integrally with the supported section of the aiming screw.

In such a case, the second annular elastic waterproofing ribs that are in sliding contact with the inner peripheral surface of the screw insertion hole and are formed integrally with the supported section of the aiming screw are held in a state of pressure contact with the inner peripheral surface of the screw insertion hole, thereby ensuring the waterproofing of the rotation support portion of the aiming screw.

Moreover, because the synthetic resin waterproofing ribs have elasticity (flexibility), when the supported portion of the aiming screw is inserted into the cylindrically shaped portion (screw insertion hole), the second waterproofing ribs are elastically deformed and do not impede the assembling of the aiming screw in the screw insertion hole. In addition, the sliding contact portion between the second waterproofing ribs and the inner peripheral surface of the screw insertion hole does not impede the rotation of the aiming screw.

The synthetic resin second waterproofing ribs are not deteriorated by water as much as are rubber O rings.

As a result, because the rotation support section of the aiming screw is waterproofed in two locations by the waterproofing means that uses the elastic waterproofing ribs in the peripheral edge portion of the screw insertion hole in the lamp body outer side and by the waterproofing means that uses the second elastic waterproofing ribs in the inner portion of the screw insertion hole, it is possible to doubly ensure the waterproofing of the rotation support portion of the aiming screw.

The reflector may also be made from synthetic resin, and the aiming fulcrum formed from a ball joint comprising a ball portion made from synthetic resin that protrudes from one of the reflector and the lamp body and a ball receiving portion made from synthetic resin that is capable of engaging with the ball portion and that protrudes from the other of the reflector and the lamp body.

In addition to the aiming screw, by forming the reflector and the ball joint that comprises the ball receiving portion and the ball portion forming the aiming fulcrum from synthetic resin, the entire aiming mechanism can be made from synthetic resin.

BRIEF DESCRIPTION OF THE DRAWINGS

FIGS. 7A–7D show the cylindrically shaped portion forming the rotation support portion of the aiming screw, of which

DESCRIPTION OF THE PREFERRED EMBODIMENTS

Preferred embodiments of the present invention will now be described.

FIGS. 1 to 13 show a first embodiment of the present invention.

In these figures, reference numeral 10 denotes a container-shaped lamp body made from polypropylene resin. A front lens 12 is fitted to a front surface aperture portion of the lamp body 10 defining a lamp compartment S. A reflector 14, to which a bulb 18 serving as a light source is attached, is mounted in the lamp compartment S so as to be tiltable by an aiming mechanism E. Reference numeral 13 denotes an extension reflector provided between the reflector 14 and the front lens 12 for making the interior of the lamp compartment S appear as a mirrored surface.

The aiming mechanism E is provided with a ball joint 20 forming an aiming fulcrum P disposed between the lamp body 10 and the reflector 14, a pair of aiming screws 30 and 40 rotatably supported respectively in the screw insertion holes 10a and 10b provided in the lamp body 10, and a pair of nut members 130 and 140 that are attached to brackets 150a and 150b, respectively, which protrude from the rear surface of the reflector 14 and form an aiming point by engaging with respective threaded portions 32 and 42 of the aiming screws 30 and 40.

Reference numeral 22 denotes a ball member made from synthetic resin attached to a bracket 150c protruding from the rear surface of the reflector 14. A ball joint 20 is formed by a ball portion 23 of this ball member 22 supported in a ball-receiving portion 24 formed integrally with the inner side of the lamp body 10. The ball-receiving portion 24 is formed in the shape of a cylinder, and vertical slits are formed at equidistant intervals in the peripheral direction in the distal end side of the cylinder portion. As a result, the ball portion 23 is able to be inserted in and removed from the ball receiving portion 24.

Reference numeral 230 (240) denotes a cylindrical nut slide guide formed integrally with the lamp body 10. The nut member 130 (140) that meshes with the aiming screw 30 (40) is carried and guided by this slide guide 230 (240) so as to be able to advance or retreat in the longitudinal direction.

When the aiming screw 30 is rotated, the nut member 130 is made to advance or retreat along the threaded portion 32 of the aiming screw and the reflector 14 is tilted about a vertical tilt axis Ly that connects the ball joint 20 with the nut member 140. When the aiming screw 40 is rotated, the nut member 140 is made to advance or retreat along the threaded portion 42 of the aiming screw and the reflector 14 is tilted about a tilt axis Lx that connects the ball joint 20 with the nut member 130. Namely, the aiming screw 30 forms a left/right aiming screw that adjusts the tilt of the optical axis of the lamp about the tilt axis Ly, while the aiming screw 40 forms an up/down aiming screw that adjusts the tilt of the optical axis of the lamp about the horizontal tilt axis Lx.

Next, each of the members forming the aiming mechanism E will be described in detail.

As is shown in FIGS. 6 and 7A–7D, the screw insertion holes 10a and 10b are formed from a cylindrically shaped portion 50 formed integrally with the lamp body 10 and which protrudes in the longitudinal direction. Slits 52 extending in the axial direction are provided at six equidistant locations in the peripheral direction in a forward extending end portion 50A of the cylindrically shaped portion 50. Six dividing sidewalls 53, which serve as dividing swinging pieces partitioned by the slits 52, are formed so that each one is able to swing in the radial direction. Anchoring portions 54 protruding in the radially inward direction are formed on the inside of the distal end portions of each dividing sidewall 53.

Figure 6:
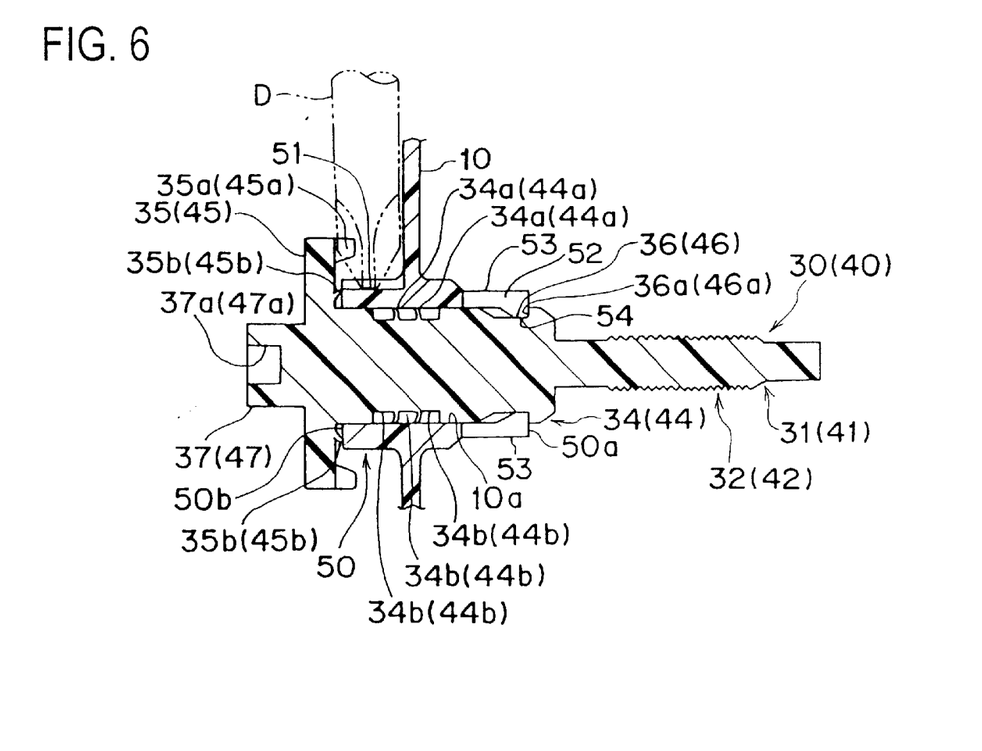
FIG. 6 is an enlarged longitudinal cross-sectional view of the rotation support portion of the aiming screw.
Figure 7A:
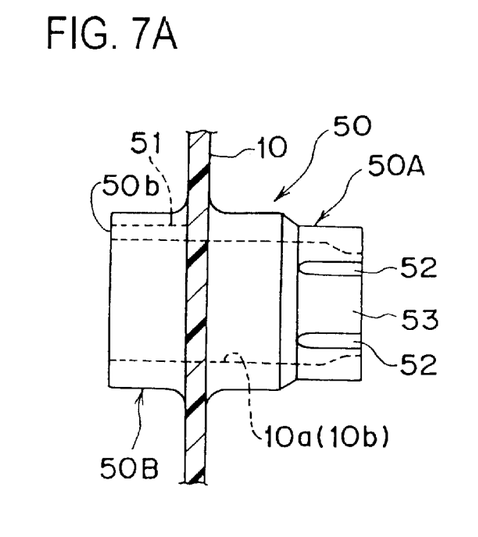
FIG. 7A is an enlarged side view of the same cylindrically shaped portion.
Figure 7B:
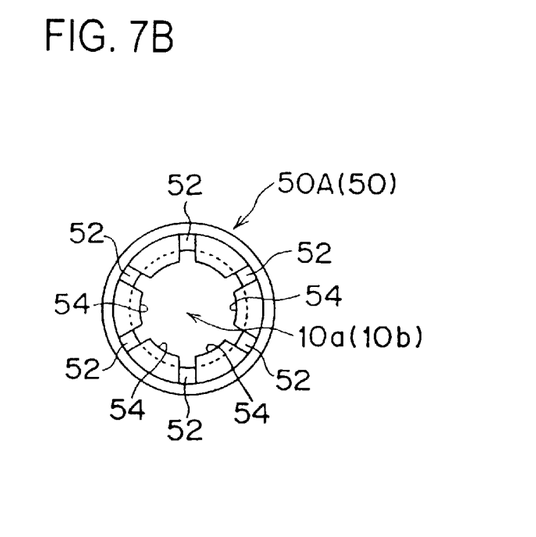
FIG. 7B is an enlarged front view of the same cylindrically shaped portion.
Figure 7C:
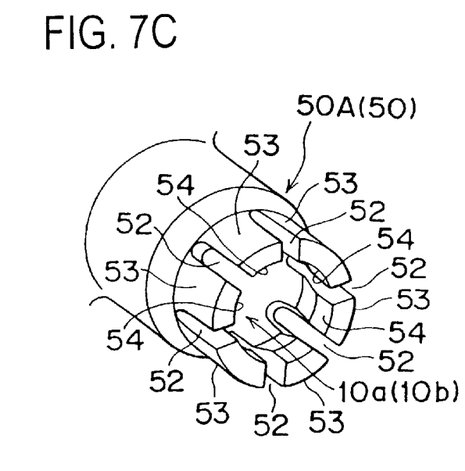
FIG. 7C is an enlarged perspective view of the same cylindrically shaped portion.
Figure 7D:
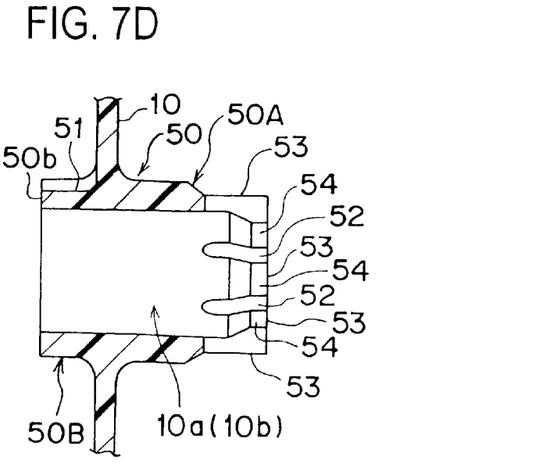
FIG. 7D is an enlarged longitudinal cross-sectional view of the same cylindrically shaped portion.

As is shown in FIG. 6, the length of the protrusion of a rearward extending portion 50B of the cylindrically shaped portion 50 is chosen so as to accommodate a distal end portion of a screwdriver D used for rotating the aiming screw provided along the lamp body 10. A flat surface 51 is formed at the top surface of the rearward extending portion 50B against which the distal end portion of the screwdriver D abuts, and the distal end portion of the screwdriver D is thereby prevented from sliding away in the outer peripheral direction of the cylindrically shaped portion 50 when the screwdriver D is rotated.

Figure 1:
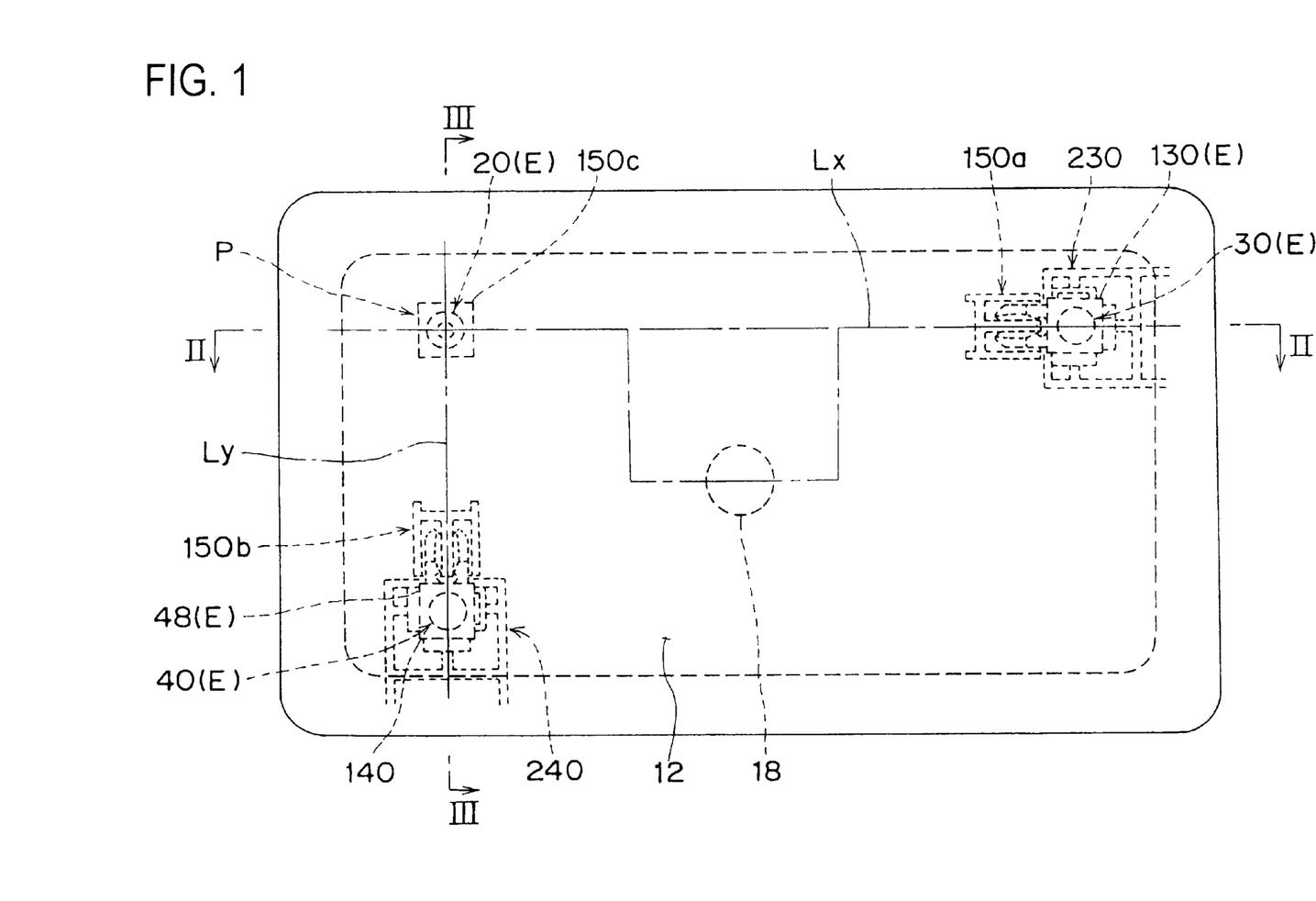
FIG. 1 is a front view of a vehicular headlamp constructed in accordance with a first embodiment of the present invention.
Figure 2:
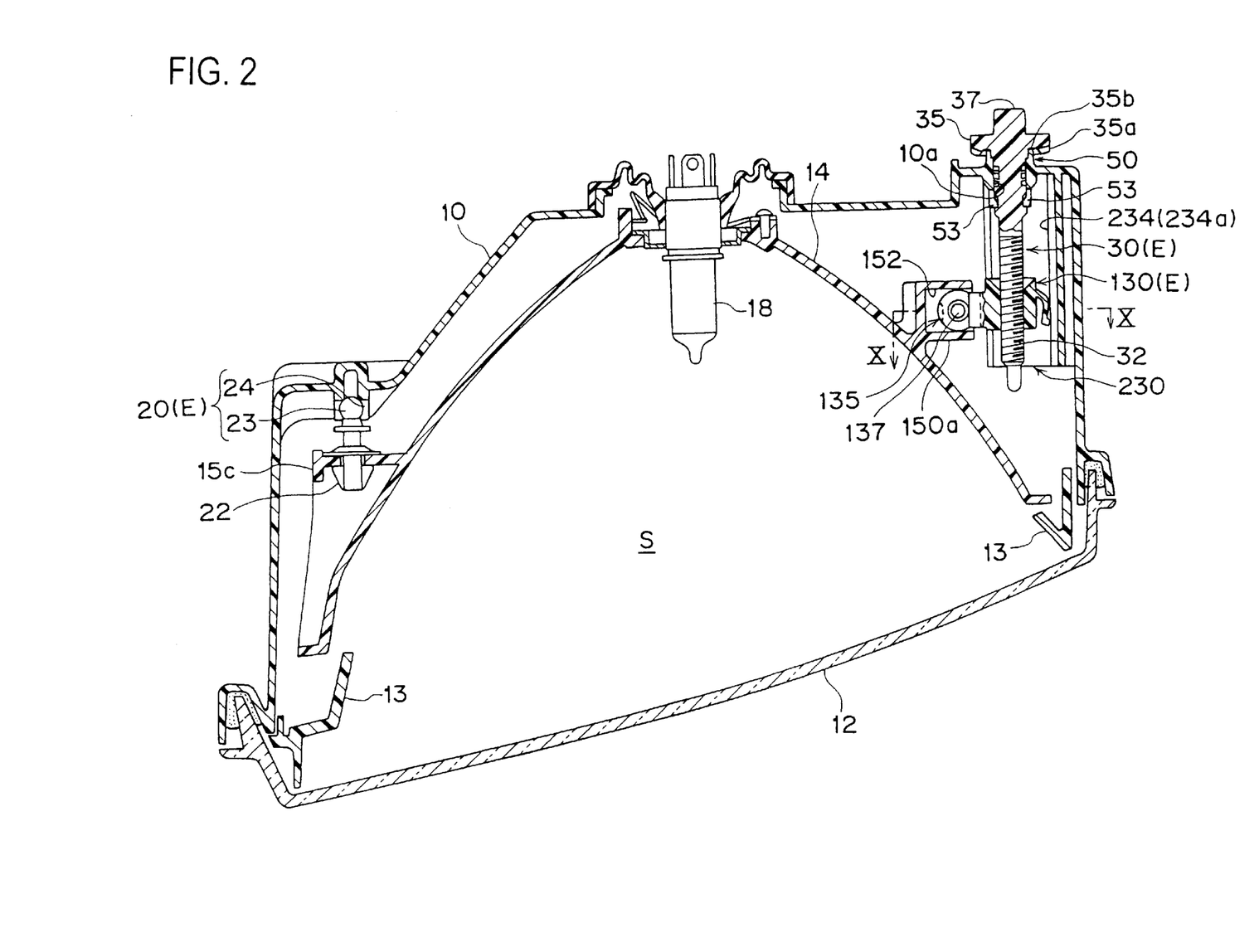
FIG. 2 is a horizontal cross-sectional view (along the line II—II in FIG. 1) of the same headlamp.
Figure 3:
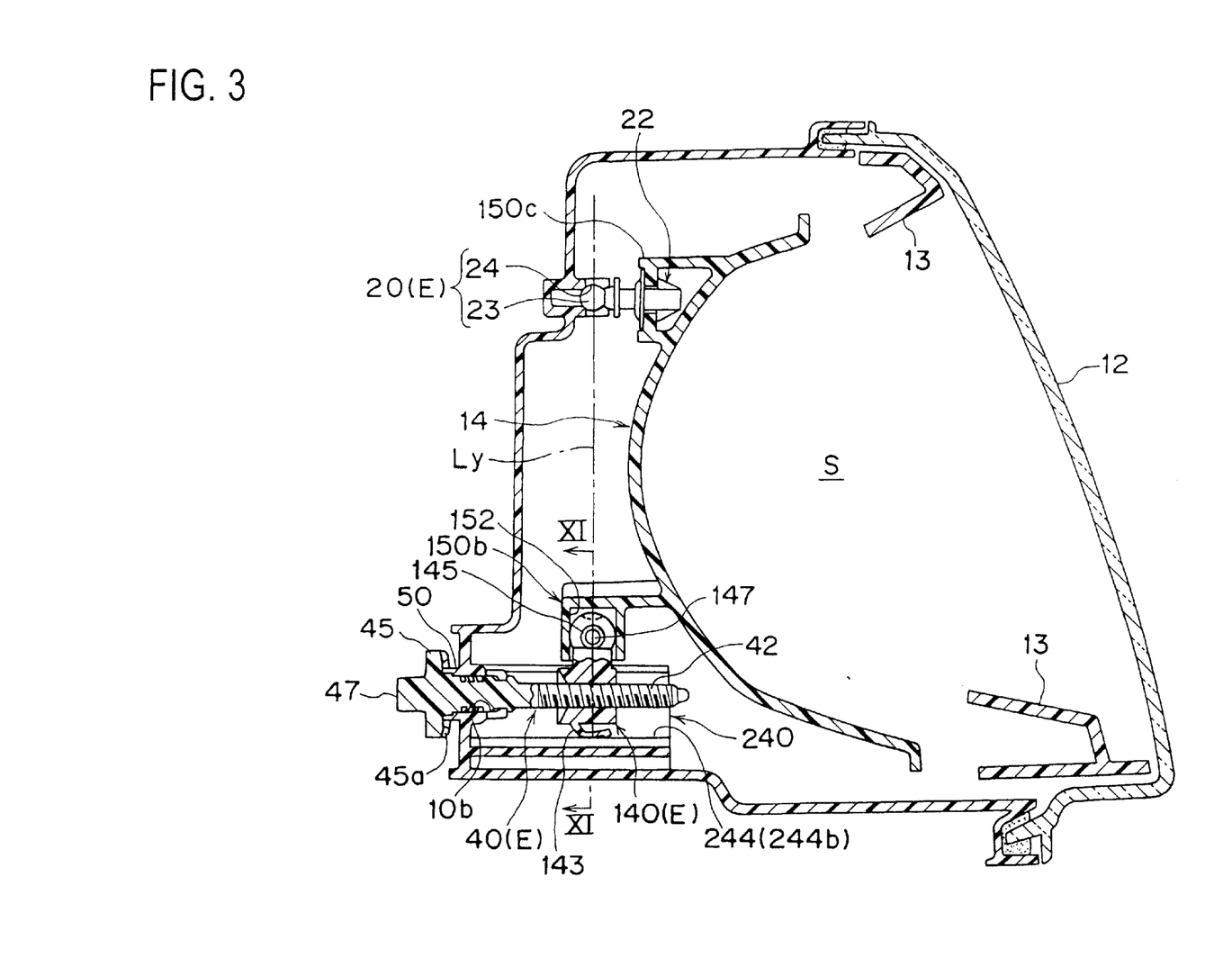
FIG. 3 is a longitudinal cross-sectional view (along the line III—III in FIG. 1) of the same headlamp.
Figure 4:
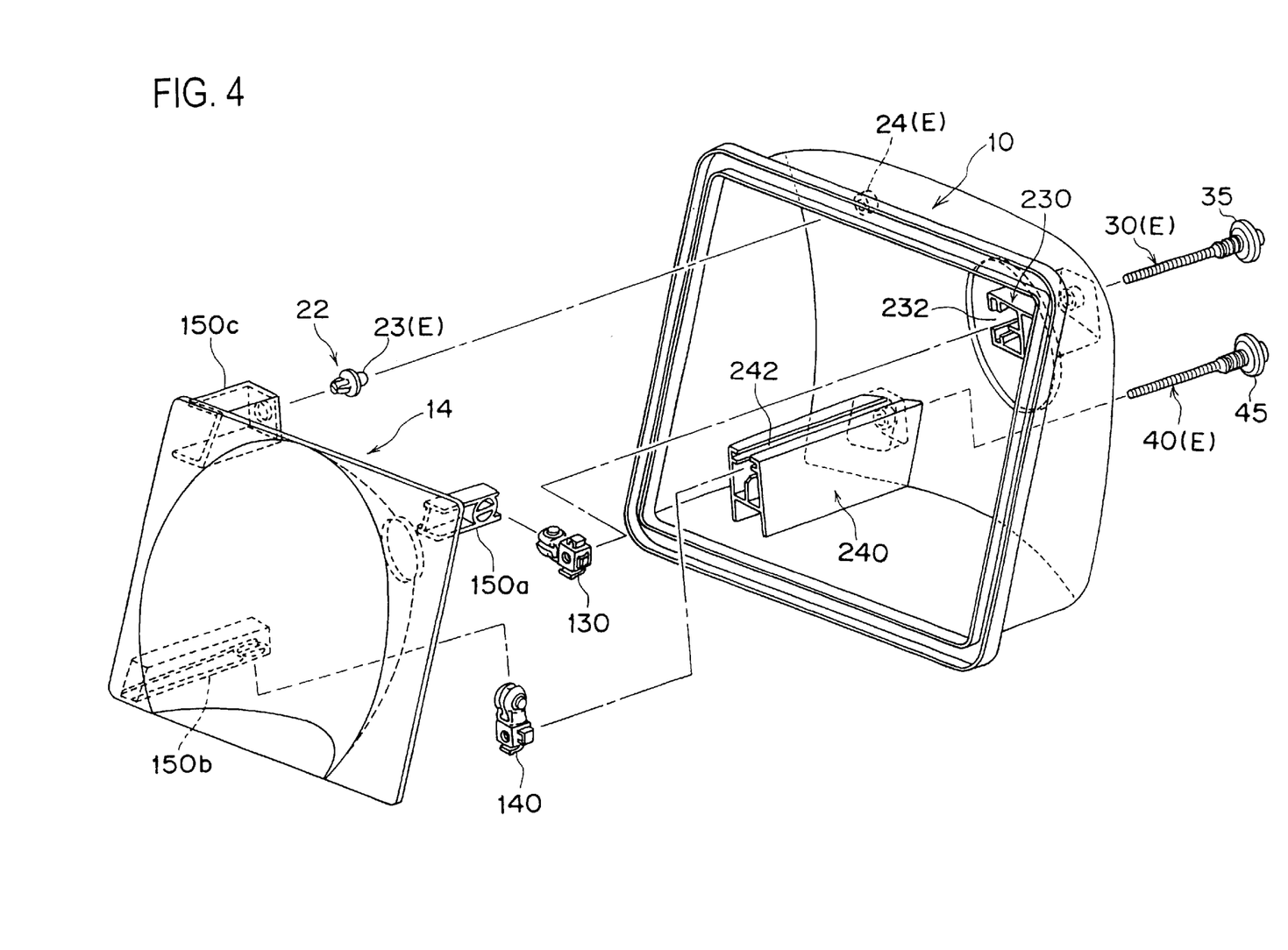
FIG. 4 is an exploded perspective view of the lamp body, reflector, and aiming mechanism.
Figure 5:
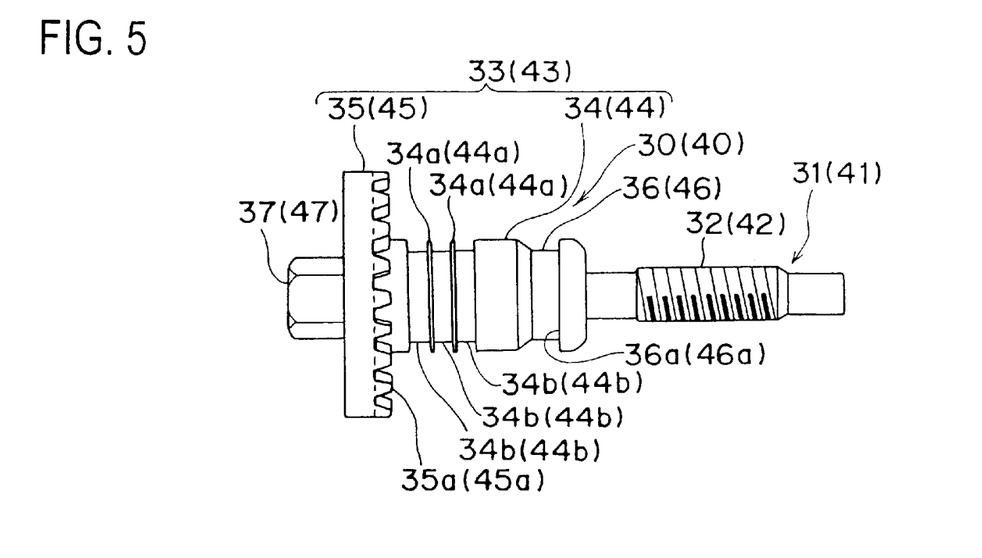
FIG. 5 is an enlarged side view of the aiming screw.

As is shown in FIGS. 5 and 6, the entirety of the aiming screw 30 (40), including a rear end crown-shaped gear portion 35 as well as the front-end screw body 31 (41) in which is formed the threaded portion 32 (42), is formed from a synthetic resin such as polyacetal resin, for example.

Reference numeral 34 (44) denotes a portion of the aiming screw 30 (40) supported by the cylindrically shaped portion 50, namely, indicates a supported portion. The crown-shaped gear portion 35 (45) that abuts against the end surface 50b of the rearward extending portion of the cylindrically shaped portion 50 is formed integrally with this supported portion 34 (44). An engaging groove 36 (46), which is a concave engaging portion that engages with the anchoring portion 54 of the forward extending portion 50A of the cylindrically shaped portion 50, encircles the supported portion 34 (44) near the front end thereof. As a result of the base of the gear portion 35 (45) in the aiming screw 30 (40) abutting against the rear end surface 50b of the cylindrically shaped portion 50 as well as a step portion 36a (46a) at the front end side of the engaging groove 36 (46) engaging with the front end surface 50a of the cylindrically shaped portion 50, the aiming screw 30 (40) is fixed in position in the axial direction relative to the screw insertion hole 10a (10b).

Teeth 35a (45a) of the crown-shaped gear portion 35 (45) is provided toward the front (i.e., on the side facing the lamp body 10). As is shown in FIG. 6, if the distal end portion of the screwdriver D used for rotating the aiming screw provided along the lamp body 10 is placed against the flat surface 51 of the cylindrically shaped portion 50, the teeth of the screwdriver D mesh precisely with the teeth 35a (45a) of the crown-shaped gear portion 35 (45) and the rotation force of the screwdriver D is able to be transmitted to the crown-shaped gear portion 35 (45).

A rotation operation portion 37 (47), whose exterior has a cross-sectional shape of a regular hexagon and which has an angular groove 37a (47a) provided in the end surface thereof, is formed integrally with the rear end portion (to the rear of the crown-shaped gear portion 35 (45)) of the aiming screw 30 (40). Instead of using the screwdriver D, it is thus also possible to rotate the aiming screw 30 (40) using a tool such as a wrench or the like.

A skirt-shaped first elastic waterproofing rib 35b (45b) that slides over the rear end face 50b of the cylindrically shaped portion 50 is provided near the base of the crown-shaped gear portion 35 (45) of the aiming screw 30 (40). This first elastic waterproofing rib 35b (45b) is held in a state of pressure contact against the rear end surface 50b of the cylindrically shaped portion 50 and functions to ensure that the rotation support portion of the aiming screw 30 (40) is kept waterproof.

The force of the pressure contact of the first elastic waterproofing rib 35b (45b) elastically supports the aiming screw 30 (40) in the axial direction and holds the aiming screw 30 (40) so that it does not vibrate at the rotation support portion.

This first elastic waterproofing rib 35b (45b) that is made from synthetic resin has an appropriate amount of elasticity (flexibility) and, because the rear end surface 50b of the synthetic resin cylindrically shaped portion 50 is a flat, smooth surface, the portion where the first waterproofing rib 35b (45b) slides against the cylindrically shaped rear end surface 50b does not impede the rotation of the aiming screw 30 (40).

Annularly shaped second elastic waterproofing ribs 34a (44a) that slide against the inner peripheral surface of the cylindrically shaped portion 50 (i.e., the screw insertion hole 10a (10b)) are formed integrally with the supported portion 34 of the aiming screw. The outer diameter of each second waterproofing rib 34a (44a) is made slightly larger than the inner diameter of the screw insertion hole 10a (10b) and the distal end portion of the waterproofing rib 34a (44a) is in constant pressure contact with the inner peripheral surface of the screw insertion hole 10a (10b).

Annular grooves 34b (44b) extending along the waterproofing ribs 34a (44a) are formed on both sides of the elastic waterproofing ribs 34a (44a) at the outer peripheral surface of the supported portion 34 (44). By increasing the amount that the elastic waterproofing ribs 34a (44a) protrude in the radial direction, it is possible, without enlarging the gap between the supported portion 34 (44) of the aiming screw and the screw insertion hole 10a (10b), to increase the elasticity (flexibility) of the elastic waterproofing ribs 34a (44a). Consequently, it is possible to allow an appropriate pressure contact force to operate between the elastic waterproofing ribs 34a (44a) and the screw insertion hole 10a (10b).

That is, if the annular grooves 34b (44b) are not provided, the length by which the elastic waterproofing ribs protrude (i.e., their height in the radial direction) must be decreased by a corresponding amount, as a result of which and the elasticity (flexibility) thereof is insufficient. Thus, excessive pressure contact force acts between the elastic waterproofing ribs and the inner peripheral surface of the screw insertion hole, which increases the rotational torque of the aiming screw. This in turn leads to the concern that the aiming screw will not be able to be rotated smoothly and that the aiming screw will not be able to be smoothly inserted into the screw insertion hole. In order to increase the elasticity (flexibility) of the elastic waterproofing ribs 34a (44a), it is also possible to enlarge the gap between the supported portion 34 (44) and the screw insertion hole 10a (10b) and to increase the length of protrusion of the waterproofing ribs; however, this is not preferable because the larger the gap, the less the waterproofing performance and the more looseness generated in the rotation support portion.

Therefore, in the present embodiment, an annular groove 34b (44b) is formed along the base of the waterproofing ribs 34a (44a), the length of protrusion of the elastic waterproofing ribs 34a (44a) is increased, and the sliding friction resistance as well as the pressure contact force generated between the elastic waterproofing ribs 34a (44a) and the inner peripheral surface of the screw insertion hole 10a (10b) are reduced without enlarging the gap between the supported portion 34 (44) and the inner peripheral surface of the screw insertion hole 10a (10b), namely, without reducing the waterproofing performance. Accordingly, smooth rotation of the aiming screw 30 (40) and smooth insertion of the aiming screw 30 (40) in the screw insertion hole 10a (10b) are ensured.

The waterproofing ribs 34a (44a) extend parallel to one another at two locations in the axial direction. The annularly shaped sliding contact portion between the waterproofing ribs 34a (44a) and the inner peripheral face of the screw insertion hole 10a (10b) is formed as a two-stage step enabling the waterproofing performance of the rotation support portion of the aiming screw 30 (40) to be increased by the same amount.

Next, the method by which the aiming screws 30 and 40 are assembled in the cylindrically shaped portion 50 of the lamp body 10 (i.e., the screw insertion holes 10a and 10b) will be described in detail.

First, the aiming screw 30 (40) is inserted into the screw insertion hole 10a (10b) from the rear of the lamp body 10. The male threaded portion 32 (42), whose outer diameter is smaller than the diameter of the screw insertion hole 10a (10b), can be smoothly inserted into the screw insertion hole 10a (10b). When the front end portion of the supported portion 34 (44), whose outer diameter is slightly smaller than the diameter of the screw insertion hole 10a (10b), hits the anchoring portions 54 of the dividing swinging pieces (i.e., the dividing sidewalls) 53 that form the forward extending end portion of the cylindrically shaped portion 50, as the supported portions 34 (44) move forward, the dividing swinging pieces 53 are pushed by the front end portions of the supported portions 34 (44) and are elastically deformed so that the diameter thereof is increased toward the outer side in the radial direction. As the anchoring portion 54 of the dividing swinging pieces (dividing sidewalls) 53 are engaged with the engaging groove 36 (46) of the aiming screw (i.e., of the supported portion), and also the elastic waterproofing ribs 35b (45b) provided at the rear end of the supported portion 34 (44) are placed in contact (i.e., in pressure contact) with the cylindrically shaped portion rear end surface 50b, the aiming screw 30 (40) is placed in a state in which it is fixed in position in the axial direction relative to the screw insertion hole 10a (10b).

Next, descriptions will be given of each of the nut member 130 (140) that meshes with the aiming screw 30 (40), the nut slide guide 230 (240) that carries the nut member 130 (140) and also slidably supports it, and the engaging holes 152 in the brackets 150a and 150b to which the nut member 130 is attached.

As is shown in FIGS. 1, 4, 10, and 11, the nut slide guide 230 (240) extends forward and rearward so as to cover the aiming screw 30 (40), and is formed in a rectangular cylindrical shape whose side surface on the side of the aiming fulcrum P is open. The nut slide guide 230 is provided at the top right when looking at the lamp body 10 in front view while the nut slide guide 240 is provided at the bottom left when looking at the lamp body 10 in front view.

Figure 10:
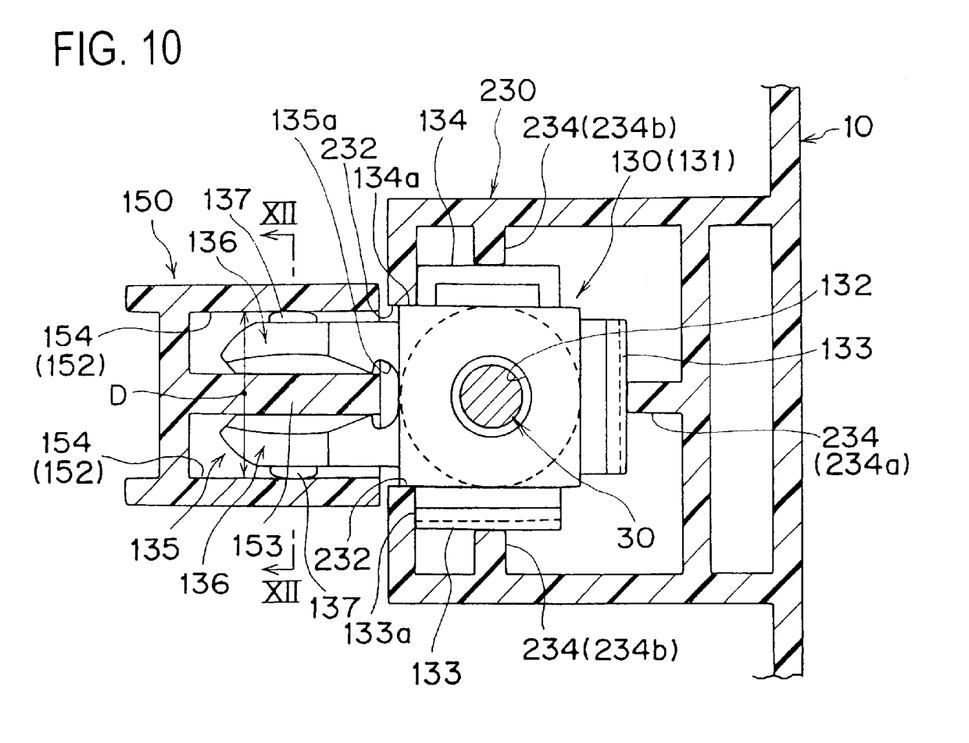
FIG. 10 is a cross-sectional view (along the line X—X in FIG. 2) of the attachment portion of the bracket and nut member.
Figure 11:
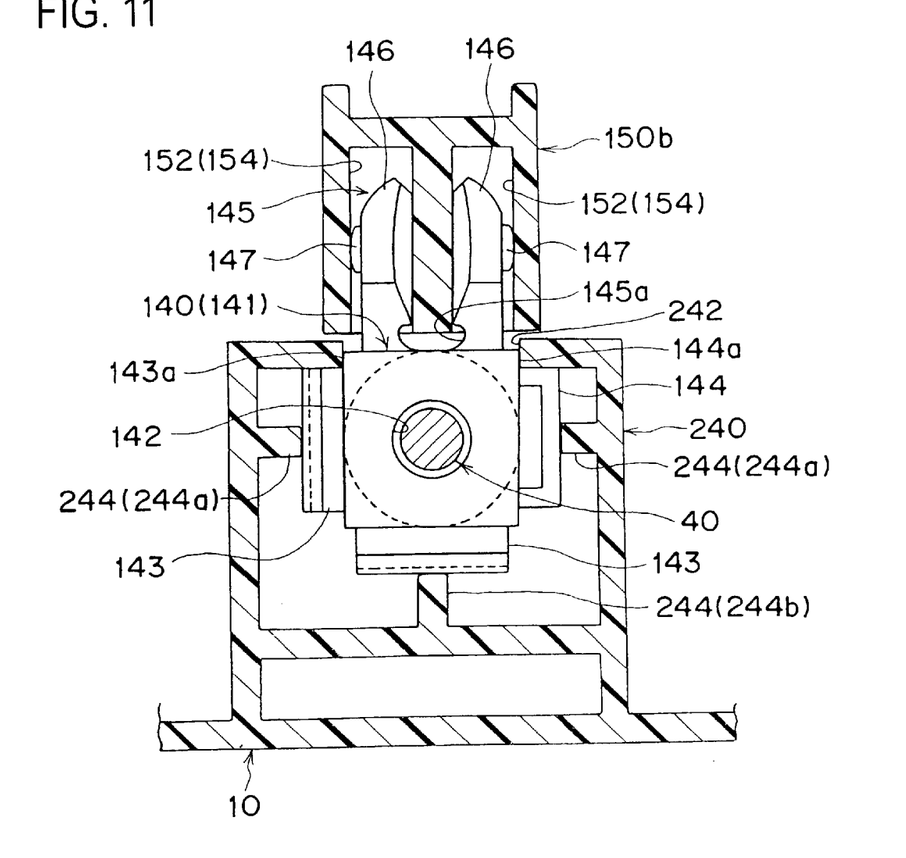
FIG. 11 is a cross-sectional view (along the line XI—XI in FIG. 3) of the attachment portion of the bracket and nut member.

Ribs 234 (244) extending forward and rearward for directly guiding the nut member 130 (140) are formed at the inner side of the sidewall in which no side surface aperture portion 232 (242) is formed. Reference numeral 234a (244a) denotes a horizontal rib, while reference numeral 234b (244b) denotes a vertical rib.

As is shown in FIGS. 4, 8, 9, 10 and 11, on the other hand, the nut member 130 (140) is formed with a female threaded portion 132 (142), which meshes with the aiming screw 30 (40) and is formed from a nut member body 131 (141) formed in the shape of a rectangular block that is capable of being housed in the slide guide 230 (240), and an engaging projection 135 (145), which protrudes from a side surface of the nut member body 131 (141) and that is capable of engaging with the engaging hole 152 in the bracket 150a (150b).

Figure 8:
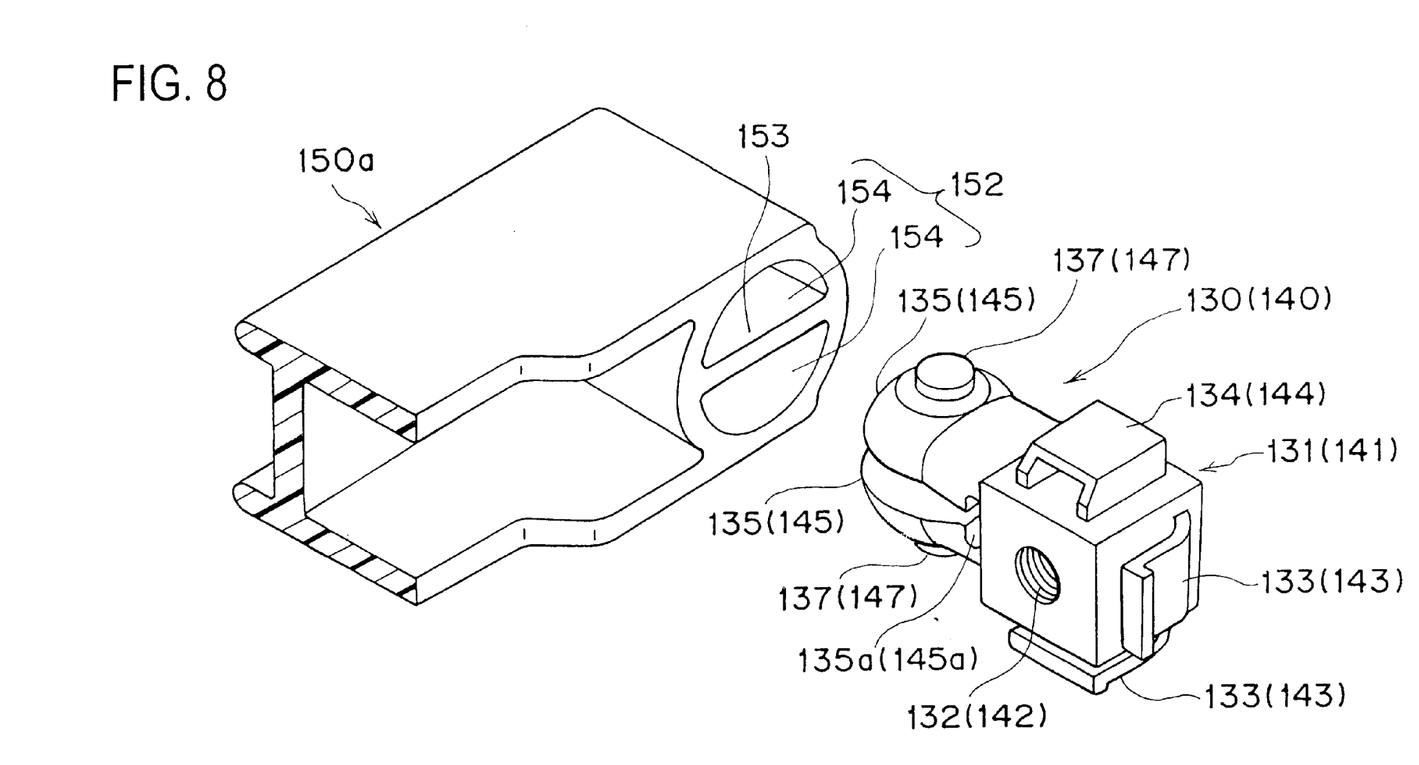
FIG. 8 is a perspective view of the nut member and nut engaging hole.
Figure 9:
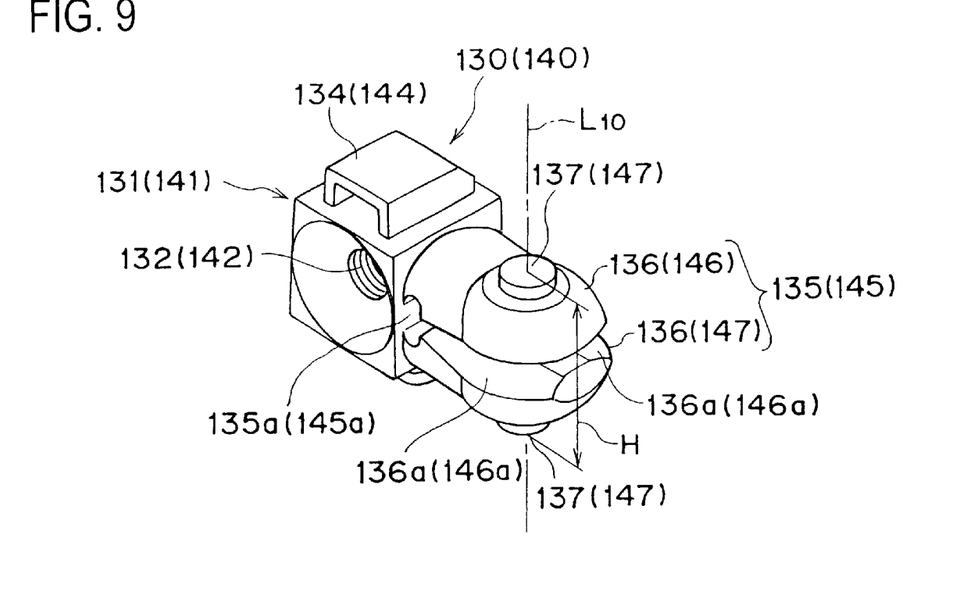
FIG. 9 is a perspective view of the nut member.

Elastic protruding portions 133 (143) with an L-shaped cross section that are shaped like plate springs and that slide in a state of pressure contact against the respective distal end portions of the ribs 234 (244) of the nut slide guide 230 (240) are formed on the side surfaces of the nut member 130 (140) on which the engaging projection 135 (145) is not formed. The plate spring shaped elastic protruding portions 133 (143) are in pressure contact with the ribs 234 (244), and the nut member 130 (140) is supported under pressure in the nut slide guide 230 (240).

A U-shaped frame 134 (144) that abuts against a rib 234 (244) is formed on the top surface of the nut member 130 (140) (i.e., on the top surface in the configuration shown in FIG. 8), and is formed so that a step portion 134a (144a) between the U-shaped frame 134(144) and the nut member body 131 (141), and a step portion 133a (143a) between the elastic protruding portion 133 (143) and the nut member body 131 (141) are engaged with the edge portion of the side surface opening portion 232 (242) of the nut slide guide 230 (240). The nut member 130 (140) inside the nut slide guide 230 (240) is held in a position in which it is pushed against the nut slide guide 230 (240) by the spring force of the elastic protruding portion 133 (143) and is reliably able to be slid smoothly along the aiming screw 30 (40) without any looseness.

As is shown in FIGS. 8, 9, 10, and 11, the distal end portion of the engaging projection 135 (145) is formed such that the outer shape thereof is substantially spherical and is also separated into two portions. To match this, the engaging hole 152 formed in the bracket 150a (150b) is also divided into two holes 154, 154 by a partitioning wall extending parallel to the aiming screw. Bifurcated engaging portions 136, 136 (146, 146) are each engaged with the holes 153, 153 thereby forming an attachment portion of the bracket 150a (150b) with the nut member 130 (140).

Convex portions 137, 137 (147, 147), whose distal end surface is a spherical surface, are disposed opposite one another protruding from the outer peripheral surfaces of the bifurcated engaging portions 136, 136 (146, 146). Moreover, as is shown by reference numeral 135a (145a), large hollowed-out portions are formed in the bifurcated proximal end portions, giving the bifurcated engaging portions 136, 136 (146, 146) flexibility in the directions in which they approach and move away from each other. A distance H between the opposite convex portions 137, 137 (147, 147) is made to be slightly larger than the inner diameter D of the engaging hole 152 and the bifurcated engaging portions 136, 136 (146, 146) that are inserted in the engaging hole 152 (i.e., the two holes 154, 154) are elastically deformed in the direction in which they approach each other. The resulting reaction force causes the convex portions 137, 137 (147, 147) to be held in a state where they are in pressure contact with the inner peripheral surfaces of the engaging holes 154, 154.

The engaging projection 135 (145) and the engaging holes 152, which are able to slide relative to each other in the direction in which the engaging hole 152 extends, act to relieve the stress caused by the compression force and the tensile force acting in the direction along the engaging hole 152.

Further, the engaging projection 135 (145) and the engaging hole 152 are able to swing relatively about an axis L10 (see FIG. 9) that passes through the convex portions 137, 137 (147, 147) and act to relieve the stress acting around the axis L10 that passes through the convex portion 137, 137 (147, 147).

Figure 12:
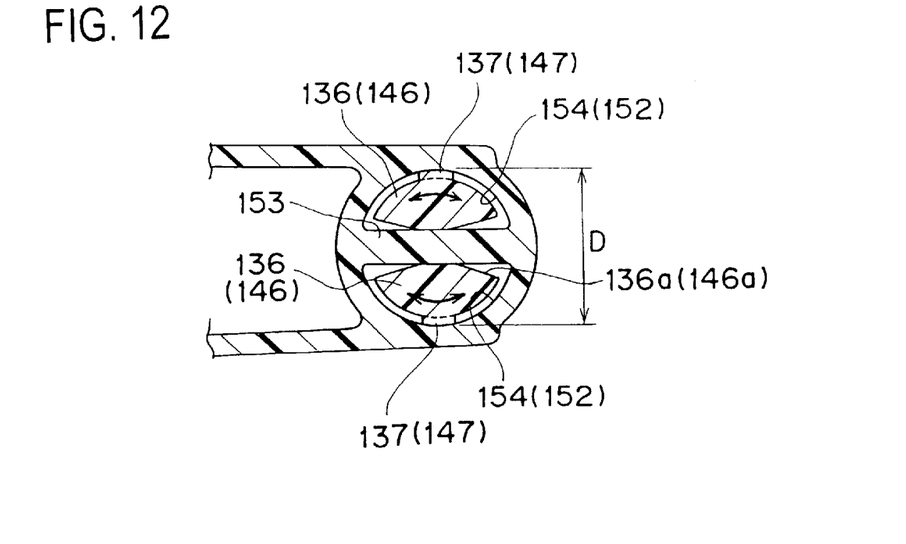
FIG. 12 is a cross-sectional view (along the line XII—XII in FIG. 10) of the nut engaging hole.

Moreover, as is shown in FIGS. 9 and 12, the opposing surfaces of each of the bifurcated engaging portions 136, 136 (146, 146) are made with a trapezoidally shaped cross section (the outer side portions in the transverse direction of each opposing surface are chamfered in a tapered shape), and are formed so that the engaging projection 135 (i.e., the engaging portion 136) and the engaging hole 152 (154) are capable of relative rotation in the peripheral direction (i.e., in the direction of the arrows shown in FIG. 12) of the engaging hole 152 (154). This results in the stress applied in the peripheral direction of the engaging hole 152 (154) being relieved. Reference numeral 136a (146a) denotes a chamfered portion.

Figure 13:
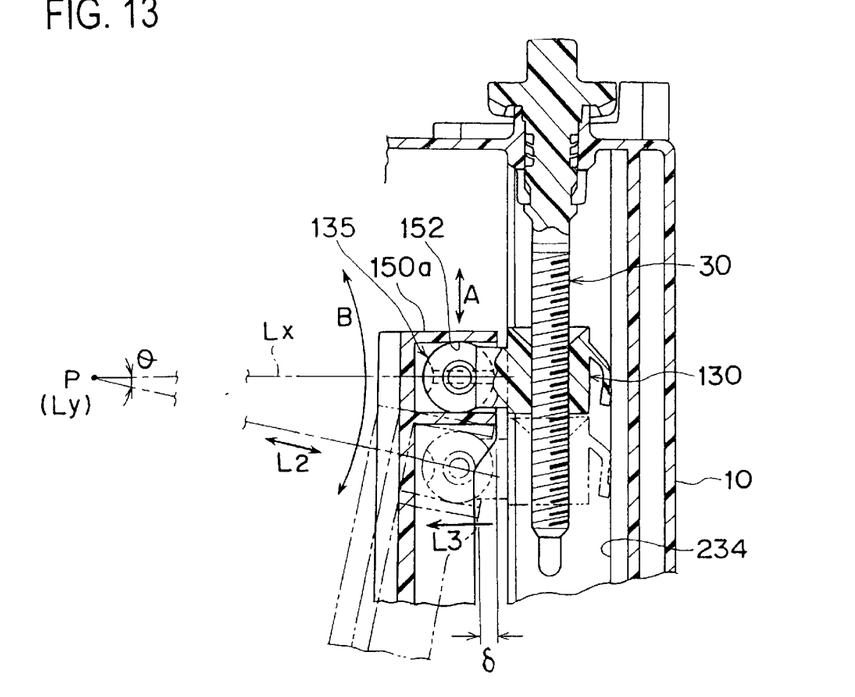
FIG. 13 is an explanatory view explaining the stress relieving action between the nut member and the nut engaging hole.

For example, as is shown in FIG. 13, when the aiming screw 30 is rotated, the nut member 30 is made to advance or retreat in the directions shown by the arrows A along the screw 30 (i.e., in a rectilinear motion). Simultaneously, the engaging hole 152 of the bracket 150a of the reflector 14 is rotated (tilted) about the aiming fulcrum P (the vertical tilting axis Ly), in the directions shown by the arrows B. As a result, stress corresponding to the difference (i.e., displacement) in the paths of movement is generated in the engaging portion (i.e., the engaging projection 135 and the engaging hole 152) between the two members (i.e., the nut member 130 which has a rectilinear motion and the bracket 150a which has a rotational motion) having different paths of movement.

However, when the nut member 130 is made to advance or retreat along the screw 30, the engaging projection 135 on the nut member 130 and the engaging hole 152 in the bracket 150a slide relatively in the engaging direction (i.e., in the direction in which the engaging hole 152 extends). Consequently, the tensile stress (compression stress) corresponding to the displacement δ in the direction along the horizontal tilt axis Lx that passes through the aiming fulcrum P in the attachment portion where the nut member 130 is attached to the bracket 150a is relieved.

The engaging projection 135 and the engaging hole 152 swing relatively in the horizontal direction (i.e., swing relatively about the axis L10), thereby relieving the torque corresponding to the angular displacement θ between the direction of protrusion L3 of the engaging projection 135 and the direction of extension L2 of the engaging hole 152 in the attachment portion where the nut member 130 is attached to the bracket 150a. Namely, the stress that is generated in the attachment portion when the reflector 14 is tilted about the vertical tilt axis Ly that passes through the aiming fulcrum P is relieved.

Further, the engaging projection 135 and the engaging hole 152 rotate relatively in the peripheral direction of the engaging hole 152, thereby relieving the stress generated in the attachment portion where the nut member 130 is attached to the bracket 150a when the reflector 14 is tilted about the horizontal tilt axis Lx that passes through the aiming fulcrum P.

In cases such as when the reflector 14 undergoes thermal expansion due to the heat given off from the light source, stress is generated in the attachment portion of the nut member 130 with the bracket 150a as the reflector 14 is deformed; however, this is relieved by the stress relieving means having a ball joint structure formed from the engaging projection 135 of the ball portion and the engaging hole 152 of the ball receiving portion.

Moreover, because the bifurcated engaging portions 136, 136 (146, 146) and the partition wall 153 of the engaging hole 152 act as guides when the engaging projection 135 (145) is inserted into the engaging hole 152, the task of attaching the nut member 130 (140) to the bracket 150a (150b) is simplified.

In the same way, stress that is generated in the attachment portion of the nut member 140 and the bracket 150b can also be relieved by the stress relieving means having a ball joint structure formed from the engaging projection 145 of the ball portion and the engaging hole 152 of the ball receiving portion.

The engaging projection 135 (145) inserted into the engaging hole 152 is prevented from coming out by being held in a state of pressure contact with the inner peripheral surface of the engaging hole 152. Therefore, the task of assembling the reflector 14 in the lamp body 10 via the aiming mechanism E is simplified.

Namely, first the lamp body 10 in which the aiming screws 30 and 40 have been assembled is placed facing upward. Next, the ball member 22 is attached to the bracket 150c and the engaging projections 135 and 145 of the nut members 130 and 140 are engaged with the engaging holes 152 of the respective brackets 150a and 150b. The brackets 150a, 150b, and 150c are placed facing downward, and the reflector 14 is lowered from above the lamp body 10 while the positions of the nut members 130 and 140 are matched with the distal ends of the aiming screws 30 and 40. By then rotating the aiming screws 30 and 40, the nut members 130 and 140 are made to mesh respectively with the aiming screws 30 and 40 and, in addition, by inserting the nut members 130 and 140 inside the nut slide guides 230 and 240 and pressing the ball portions 23 of the ball receiving members 22 into the ball receiving portions 24 that are formed integrally with the reflector 14, the reflector 14 can be integrated with the lamp body 10 via the aiming mechanism E.

Figure 14:
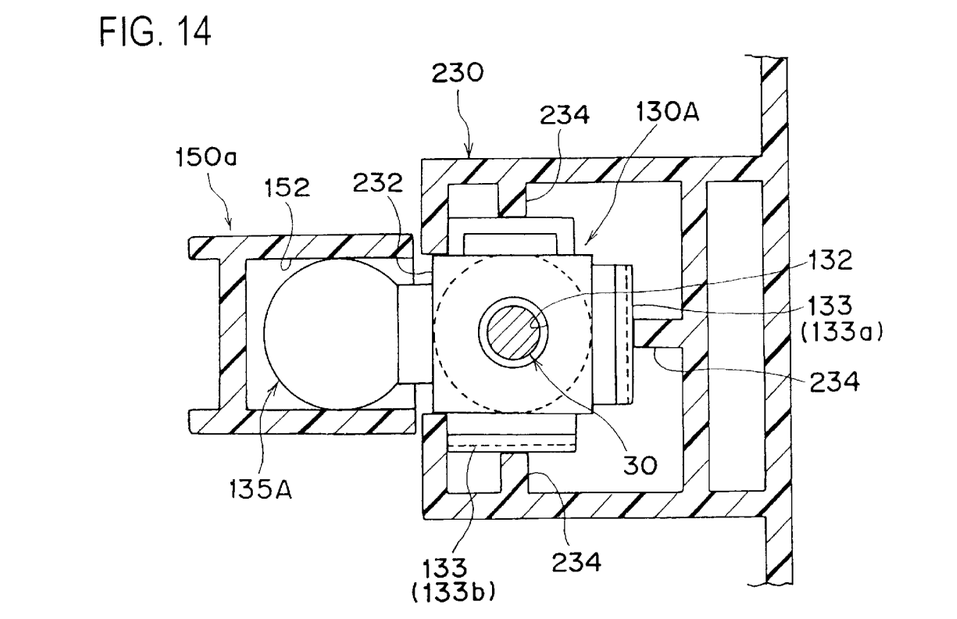
FIG. 14 is a cross-sectional view of the attachment portion of a bracket and a nut member, which is an essential portion of a second embodiment of the present invention.

FIG. 14 is a cross-sectional view of the portion where a nut member is attached to a bracket-which serves as the principal portion of a second embodiment of the present invention.

In the above described first embodiment, the engaging projection 135 is formed in a double shape, and the respective opposing surfaces of the bifurcated engaging portions 136, 136 are formed with trapezoidally shaped cross sections and are formed so that the engaging projection 135 and the bracket 150 are able to rotate relatively about the engaging hole 152. The convex portions 137, 137 are also provided in the bifurcated engaging portions 136, 136, and the bracket 150 and the nut member 130 (i.e., the engaging hole 152 and the engaging projection 135) are able to swing relatively in a horizontal direction. However, in the present embodiment, an engaging projection 135A is formed in a spherical shape, and therefore the engaging projection 135A is able to slide along the engaging hole 152 while, in addition, the engaging projection 135A and the bracket 150 are able to rotate relatively about the engaging hole 152, and the bracket 150 and the nut member 130A are able to swing relatively in a horizontal direction.

Because the rest of the structure is the same as in the above embodiments, the same elements are identified with same reference numerals and a duplicated description thereof is omitted.

Moreover, in the above embodiment the lamp body 10 is formed from polypropylene resin while the aiming screws 30 and 40 are formed from polyacetal resin, which has the appropriate resilience, excellent abrasion resistance, and is able to slide well against polypropylene resin. However, in place of polyacetal resin, it is also possible to form the aiming screws 30 and 40 from nylon resin.

As is clear from the above description, according to the vehicular headlamp with a movable reflector according to the invention, because no bending moment created by the weight of the reflector acts on the aiming screw, even if there is used an aiming screw made from synthetic resin, which is easily deformed compared to metal, the durability thereof is guaranteed and is easily able to provide the appropriate aiming.

Because there is no deformation of the aiming screw and reflector in cases when unforeseen stress is generated in the attachment portion of the nut member and the bracket when the reflector undergoes thermal expansion due to heat given off by the light source or when rotating the aiming screw (i.e., when aiming), appropriate aiming is possible.

Because the sliding movement in the direction in which the aiming screw extends is ensured, the frictional torque in the portion where the nut member meshes with the aiming screw can be kept constant when the aiming screw is rotated and smooth aiming is guaranteed by light rotation of the aiming screw.

Moreover, because no stress is generated that could deform the vertical aiming screw (or horizontal aiming screw) made from synthetic resin, the durability of the vertical aiming screw (and horizontal aiming screw) is guaranteed and smooth aiming is made possible by the light rotation of the aiming screw.

Further, because absolutely no stress is generated in the attachment portion between the nut member and the bracket (i.e., between the aiming screw and the reflector) when the reflector thermally expands due to heat given off by the light source or when the aiming screw is rotated, appropriate aiming is always possible.

Because it is possible without error to easily attach the nut member to the bracket and to hold the nut member in the engaging hole without it coming out through matching of the bifurcated engaging projections with the partition wall in the engaging hole and inserting them in the hole, the assembling of the reflector in the lamp body is simplified. Moreover, because the attachment portion between the nut member and the bracket is held without looseness, appropriate aiming is guaranteed.

Still further, because the nut member slides smoothly along the nut slide guide (the aiming screw), appropriate aiming is guaranteed.

With the invention it is possible to achieve reduction of the weight of a headlamp by forming the reflector and the entire aiming mechanism out of synthetic resin, and it is possible to achieve a further reduction of the weight of a headlamp by forming the entire headlamp excluding the light source from synthetic resin.

What is claimed is:

1. A vehicular headlamp comprising:
    a container-shaped lamp body made from synthetic resin;
    a front lens made from synthetic resin attached to a front surface aperture portion of said lamp body so as to define together with said lamp body a lamp compartment;
    a reflector and a light source mounted on said reflector, said reflector and said light source being housed in said lamp compartment, said reflector comprising an aiming fulcrum forming a tilt fulcrum for said reflector; and
    at least one aiming mechanism provided between said lamp body and said reflector and supporting said reflector in such a manner that said reflector may be selectively tilted relative to said lamp body, said aiming mechanism comprising:
        a synthetic resin aiming screw rotatably supported in a screw insertion hole provided in said lamp body and extending in a forward direction;
        a bracket extending from said reflector;
        a synthetic resin nut member attached to said bracket and meshing with said aiming screw, said resin nut member advancing or retreating by rotation of said aiming screw;
        a nut slide guide formed integrally with said lamp body and extending outward so as to carry and support said nut member in a manner whereby said nut member can slide in a longitudinal direction; and
        stress relieving means comprising a ball joint structure provided at an attachment portion where said nut member is attached to said bracket for relieving stress generated in said attachment portion as said nut member advances or retreats.

2. The vehicular headlamp with a movable reflector according to claim 1, wherein said at least one aiming mechanism is two in number and comprises a vertical aiming mechanism and a horizontal aiming mechanism, said vertical aiming mechanism comprising a vertical aiming screw provided at a position where it can move vertically toward or away from said aiming fulcrum, and horizontal aiming mechanism comprising a horizontal aiming screw provided at a position where it can move horizontally toward or away from said aiming fulcrum.

3. The vehicular headlamp with a movable reflector according to claim 1, wherein said attachment portion of said bracket and said nut member comprise a ball engaging projection protruding from a side surface of said nut member facing said aiming fulcrum and a ball receiving engaging hole provided in said bracket and engaged by said engaging projection, said engaging projection and said engaging hole being formed so as to allow said engaging projection to slide in an engaging direction between said engaging direction and said engaging hole so as to allowing swinging movement in a plane containing said aiming screw and so as to be able to rotate relatively in the engaging hole peripheral direction.

4. The vehicular headlamp with a movable reflector according to claim 3, wherein said engaging hole is partitioned into two holes by a partition wall extending parallel to said aiming screw, and said engaging projection is bifurcated into two pieces inserted into respective ones of said two holes and engaging said partition wall under pressure contact.

5. The vehicular headlamp with a movable reflector according to claim 4, wherein a pair of convex portions whose distal end surface is a spherical surface are disposed opposite one another protruding from outer peripheral surfaces of respective ones of said engaging pieces.

6. The vehicular headlamp with a movable reflector according to claim 3, wherein said slide guide has a side surface on a side of said aiming fulcrum side which is open, said slide guide extending longitudinally along the length of said aiming screw, said engaging projection protruding from a side surface portion of said slide guide, and wherein said nut slide comprises an elastic protruding portion that slides in pressure contact along said nut slide guide.

7. The vehicular headlamp with a movable reflector according to claim 4, wherein said elastic protruding portion is U shaped and acts as a plate spring to provide a spring force against said nut slide guide.

8. The vehicular headlamp with a movable reflector according to claim 1, wherein said aiming mechanism further comprises a support member extending through an aiming screw insertion hole in said lamp body, said support member being generally cylindrically shaped and having a plurality of slits formed in a forward extending end portion and anchoring portions extending radially inward from a forward end of said forward extending end portion, an outward end of said aiming screw being supported by support member.

9. The vehicular headlamp with a movable reflector according to claim 8, wherein said aiming screw comprises a crown gear portion at an outward end thereof outside said lamp body and abutting a rearward extending end portion of said support member.

10. The vehicular headlamp with a movable reflector according to claim 9, wherein a portion of said aiming screw passing through said support member comprises at least one annularly shaped elastic waterproofing rib pressing against an inner surface of said support member.

11. The vehicular headlamp with a movable reflector according to claim 1, wherein said reflector is made from synthetic resin, and wherein said aiming fulcrum comprises a ball joint comprising a ball portion made from synthetic resin and protruding from one of said reflector and said lamp body and a ball receiving portion made from synthetic resin, configured for engaging said ball portion, and formed on the other of said reflector and said lamp body.

* * * * *